United States Patent
Eason et al.

(10) Patent No.: US 8,434,292 B2
(45) Date of Patent: May 7, 2013

(54) CERAMIC-ENCASED HOT SURFACE IGNITER SYSTEM FOR JET ENGINES

(75) Inventors: Martin P. Eason, Johnson City, TN (US); William K. Hemphill, Johnson City, TN (US); Martin E. Olsen, Johnson City, TN (US); J. Paul Sims, Greeneville, TN (US)

(73) Assignee: State of Franklin Innovations, LLC, Johnson City, TN (US)

( * ) Notice: Subject to any disclaimer, the term of this patent is extended or adjusted under 35 U.S.C. 154(b) by 1349 days.

(21) Appl. No.: 11/957,984

(22) Filed: Dec. 17, 2007

(65) Prior Publication Data

US 2008/0141651 A1    Jun. 19, 2008

Related U.S. Application Data

(60) Provisional application No. 60/875,262, filed on Dec. 15, 2006.

(51) Int. Cl.
*F02C 7/264*  (2006.01)
*F23N 5/00*   (2006.01)

(52) U.S. Cl.
USPC .......................... 60/39.821; 431/66

(58) Field of Classification Search ............... 60/39.821, 60/39.827
See application file for complete search history.

(56) References Cited

U.S. PATENT DOCUMENTS

| | | | |
|---|---|---|---|
| 2,701,324 A * | 2/1955 | Peroutky et al. | 313/30 |
| 3,551,083 A * | 12/1970 | Michaels | 431/66 |
| 3,800,530 A * | 4/1974 | Nash | 60/761 |
| 3,875,477 A * | 4/1975 | Fredriksson et al. | 361/264 |
| 4,215,081 A | 7/1980 | Brooks | |
| 4,279,743 A | 7/1981 | Miller | |
| 4,328,529 A * | 5/1982 | Hierholzer et al. | 361/266 |
| 4,437,440 A * | 3/1984 | Suzuki et al. | 123/145 A |
| 4,475,030 A * | 10/1984 | Bailey | 219/270 |
| 5,084,606 A * | 1/1992 | Bailey et al. | 219/270 |
| 5,191,508 A * | 3/1993 | Axelson et al. | 361/257 |
| 5,362,944 A * | 11/1994 | Hatanaka et al. | 219/270 |
| 5,499,497 A * | 3/1996 | DeFreitas | 60/776 |
| 5,531,066 A | 7/1996 | Pfefferle et al. | |
| 5,786,565 A * | 7/1998 | Willkens et al. | 219/260 |
| 6,028,292 A * | 2/2000 | Willkens et al. | 219/270 |

(Continued)

FOREIGN PATENT DOCUMENTS

| DE | 19956767 | * 11/1999 |
|---|---|---|
| GB | 2097469 | * 11/1982 |
| WO | WO 2007/133629 A2 | 11/2007 |

OTHER PUBLICATIONS

International Search Report Mailed May 25, 2007 for PCT/CA2007/000160.

*Primary Examiner* — Gerald Sung
(74) *Attorney, Agent, or Firm* — Dinsmore & Shohl LLP

(57) ABSTRACT

A ceramic-encased hot surface igniter system for jet engines is presented. The advanced ceramic-encased hot surface igniter system comprises at least one electrical resistance heated element encased in a durable, thermal and mechanical shock resistant, high temperature advanced ceramic compound such as silicon nitride. The one or more advanced ceramic-encased hot surface igniter elements are mounted proximally upstream or within a combustion chamber of a jet engine enclosure or within the afterburner section of a jet propulsion engine's exhaust. The surface temperature of each ignition element's encasement being of sufficient temperature to cause the ignition of a gaseous, atomized, or liquid fuel.

20 Claims, 4 Drawing Sheets

U.S. PATENT DOCUMENTS

| | | |
|---|---|---|
| 6,106,711 A | 8/2000 | Morse et al. |
| 6,351,060 B1 | 2/2002 | Harneit |
| 6,616,890 B2 * | 9/2003 | McPhillips ............... 264/642 |
| 6,878,188 B2 | 4/2005 | Yi |
| 7,061,363 B2 * | 6/2006 | Geissinger et al. ............ 338/28 |
| 7,342,201 B1 * | 3/2008 | Heuberger et al. ........... 219/270 |

* cited by examiner

CERAMIC-ENCASED HOT SURFACE IGNITER SYSTEM FOR JET ENGINES

CROSS-REFERENCE TO RELATED APPLICATIONS

This application claims the benefit of U.S. Provisional Application Ser. No. 60/875,262, filed Dec. 15, 2006.

BACKGROUND OF THE INVENTION

The present invention, generally, relates to igniter system for a jet engine system and, in particular, relates to silicon nitride-encased hot surface igniter system for jet engine system.

The four basic parts of a typical jet engine are the compression section, turbine, combustion section and propelling nozzles. In general, a jet engine can be comprised of the following working cycles: The compression cycle where work is done to increase pressure and decrease the volume of the air resulting in a corresponding rise in temperature. The combustion cycle when fuel is added to the air and ignited to increase the temperature causing a corresponding increase in volume while the pressure remains almost constant. The expansion cycle where there is a decrease in temperature and pressure with a corresponding increase in volume. This volume is exhausted to provide thrust. Newton's third law of motion requires that the force that causes the high-speed motion of the jet of gas have a reaction force that is equal in magnitude and oppositely directed to push on the jet propulsion engine. There may be multiple stages of compressors (compressing the air flow) or turbines (extracting energy from the airflow).

There are several types of common jet engines. For example, a typical thermal jet propulsion engine operates with a continuous blast of thrust-producing, expanded heated gas. In contrast, in an intermittent duct jet propulsion system, thrust is generated by a series of pulses, or intermittent explosions. A ramjet, or continuous duct, engine relies on its own forward motion to compress the air that enters it. Although highly efficient, it is designed to operate only after high speed has been attained through the use of some other power source, typically a rocket. A scramjet, or supersonic-combustion ramjet, engine is designed to operate at hypersonic speed (i.e., above Mach 5), using hydrogen for fuel. In theory, a scramjet-propelled craft could achieve orbital speed, with an efficiency three times that of liquid- or solid-fuel rockets. In addition, without the need to carry oxygen, an air-breathing, scramjet-powered vehicle can carry a greater payload than a rocket-powered one.

Additionally, there are various thrust-augmentation methods that can be used to increase the effective driving force of jet propulsion engines: the afterburner, water-injection, and air bleed-off methods. An afterburner uses the exhaust gases from the engine for additional combustion, with resulting higher compression. However, the afterburner consumes large amounts of fuel. Injection of water into the air-compressor inlet also increases the thrust, but can be used only at take-off because of the high water consumption. Air bleed-off, sometimes called the fan augmentation method, also makes more efficient use of air otherwise wasted.

Other common forms of engines include high power-to-weight ratio, turboshaft style of jet engines, specifically gas turbine engines, that are used in many other applications beyond directly thrusting aircraft through the sky. As examples, the current generation Abrams M1-A2 main battle tank uses a 1500 HP gas turbine engine to provide power to a hydrokenetic transmission. Additionally, many U.S. Navy ships use the combined output of twin gas turbine engines, derived from a successful family of aircraft engine designs, to provide power to controllable pitch propellers through a main reduction gear, shaft and clutch. Also, turboprop aircraft use gas turbine engines as their powerplants as do many types of rotorwing aircraft (helicopter). For these types of aircraft, the turbine section provides torque to a shaft which spins one or more propellers or the main and tail rotor blades to propel the aircraft through the air. In many aircraft designs, the hot exhaust gases may be directed to provide a degree of supplementary thrust. In addition, large transport category aircraft such as Boeing 747s have at least one relatively small gas turbine engine for use as an auxiliary power unit (APU) to generate electric power and compressed air for ground-based activities prior to main engine start and during in-flight emergencies. Finally, stationary turboshaft power plants are used worldwide as mission-critical primary and/or emergency back-up generators or as prime movers for powering pumping stations for water or other fluids.

Typically, ignition in conventional jet engine designs can be accomplished by incorporating a high tension spark gap into a combustor element or, in the case of turbine engine augmenters (i.e., afterburners), the spark igniter is inserted into a fuel enriched flow stream. These systems have successfully been employed since the early development of the turbine engine. Spark igniters are provided in various locations and geometries, using different voltages and spark rates. Igniter systems employing high temperature elements in jet engines are also known. These metal encased units (commonly referred to as "Glow Plugs") typically require very large currents in order to maintain temperature. Additionally, the metal surfaces can also suffer embrittlement. Hence, these designs have not been widely employed in initiation of combustion for turbine engines.

Silicon nitride ($Si_3N_4$), an advanced ceramic, was developed in response to a need for a high strength and high temperature material. The initial application of silicon nitride was to replace metals with ceramics in advanced turbine and reciprocating engines to give higher operating temperatures and efficiencies. Even though a totally ceramic engine has never been achieved, silicon nitride has been used in a number of industrial applications, such as engine components, bearings and cutting tools. Silicon nitride has better high temperature capabilities than most metals combining retention of high strength and creep resistance with oxidation resistance. In addition, its low thermal expansion coefficient gives good thermal shock resistance compared with most ceramic materials. These characteristics make it an ideal ceramic for igniter technology.

Hot surface igniters that comprise a Silicon Nitride-encased resistive element have been employed in consumer and industrial applications to initiate combustion in stoves and furnaces for many years. The first application was as early as 1965 in the electronics industry. When voltage is applied to the hot surface igniter, it heats up which in turn causes combustion. However, standard existing hot surface igniters have not been able to achieve ignition in jet engines due to the convective cooling of the igniter in the airstreams typically associated with a jet engines.

Commercially available single cylinder and planar-shaped hot surface igniters elements for heating, ventilation, air conditioning (HVAC) systems are used primarily to light-off the pilot light which subsequently provides the source of ignition for the larger main burner(s) of the heating system. As such they operate in a nominally static (zero flow) environment using ambient air. At any particular voltage level, the current specification is set by hard wiring to a power source or via some sort of active power management system designed to provide power at levels (a) high enough to operate at a temperature above the auto ignition temperature of the fuel and (b) as low as possible to prolong the life of the wiring and resistive element(s) of, typically, a single element. Also, operating conditions do not significantly change in terrestrial installations as they do in aircraft.

The flow environment within a jet engine's combustion section down stream of the compressor section is not static but instead extremely fast and highly turbulent. The forced convection cooling effects of the air flow directly impinging upon a heated hot surface igniter's element remove so much heat that an unprotected element's encasement temperature immediately falls below the auto ignition temperature (i.e., no ignition). To compensate for this forced convective cooling, the internal resistance heating element(s) will need to be "overdriven" with an increased power such that—in a no flow or low flow fluid environment—would be of an amount of power to cause (immediate) failure of the internal heating element(s) and/or connective wiring. Jet engines used to generate thrust or torque in mission-critical applications, will, for the most part, have a plurality of igniter assemblies and a plurality of igniter controllers to achieve operational redundancy.

Therefore, there is a need for a silicon nitride-encased, hot surface igniter system for a jet engine system that can withstand the turbulent airstreams conditions encountered within an operating jet engine.

There is a need for an active power management system within each igniter control system to provide optimized levels of conditioned power depending upon RPM. Operational command conditions such as an auto-relight activation command from a Full Authority Digital Engine Controller in foul weather conditions may be employed to (a) ensure ignition and (b) prolong component life of the plurality of igniter assemblies within the at least one combustion section of the engine.

BRIEF SUMMARY OF THE INVENTION

According to the present invention, an advanced ceramic-encased hot surface igniter system for jet engines is presented. The advanced ceramic-encased hot surface igniter system comprises at least one electrical resistance heated element encased in a durable, thermal and mechanical shock resistant, high temperature advanced ceramic compound such as silicon nitride. The one or more advanced ceramic-encased hot surface igniter elements are mounted within a combustion chamber of a jet engine enclosure or within the afterburner section of a jet propulsion engine's exhaust. In operation, a controller will initiate the current flow to the igniter. This power controller drives the ignition elements to a high output state. The surface temperature of each ignition element's encasement becomes a sufficient temperature to cause the ignition of a gaseous, atomized, or liquid fuel. As convective cooling occurs, the voltage to the igniter element can be increased thereby increasing the power flowing through the internal resistive heating element and creating a corresponding rise in temperature to allow the unit's external surface to reach temperatures sufficient for combustion to occur.

In accordance with one embodiment of the present invention, the geometry of the advanced ceramic encasement can be that of a cone or tube.

In accordance with another embodiment of the present invention, more complex encasements geometries such as airfoil shapes may be utilized to help atomized fuel adhere to the advanced ceramic encased igniter element allowing easier ignition in turbulent airstreams which are commonly found within jet engines.

In accordance with yet another embodiment of the present invention, multiple igniter elements can be employed to allow for redundancy typically needed by mission-critical power plants deployed in operationally hostile environments such as those experienced by aircraft, guided missiles, naval ships, armored military vehicles, emergency power generators and the like.

Accordingly, it is a feature of the embodiments of the present invention to eliminate the need for high tension spark gap igniters in jet engines through the application of shaped silicon nitride-encased igniters.

It is another feature of the embodiments of the present invention to simplify the design, to increase reliability, to reduce weight, to reduce spark-induced radio frequency and electromagnetic interference, to provide increased monitoring capabilities and to reduce the cost associated with acquisition, operation and maintenance of jet engine systems. Other features of the embodiments of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
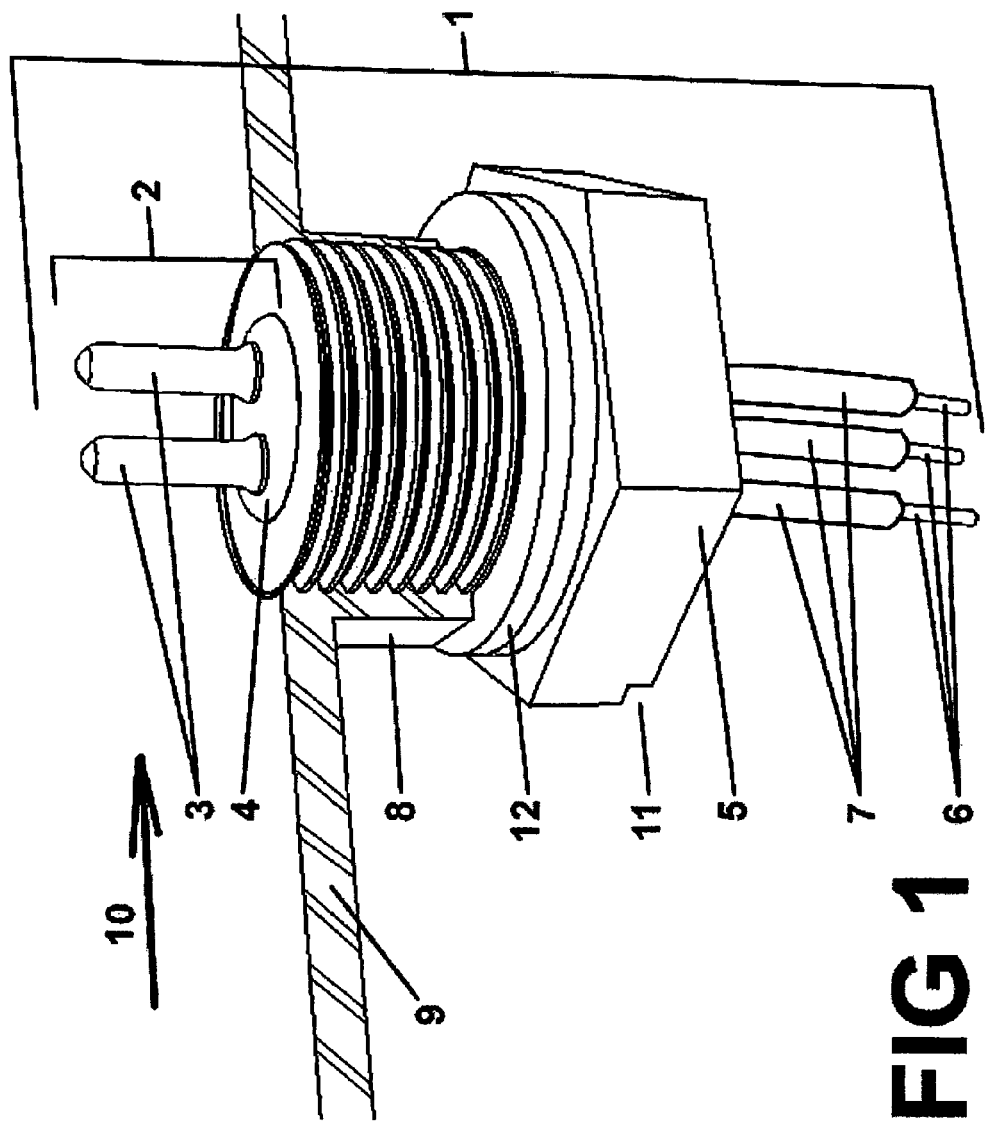
FIG. 1 illustrates a partial cutaway perspective showing a shaped-element hot surface igniter assembly threaded into a representative gas turbine combustion section according to an embodiment of the present invention.

In the following detailed description of the embodiments, reference is made to the accompanying drawings that form a part hereof, and in which are shown by way of illustration, and not by way of limitation, specific embodiments in which the invention may be practiced. It is to be understood that other embodiments may be utilized and that logical, mechanical and electrical changes may be made without departing from the spirit and scope of the present invention.

The hot surface igniter device described herein can be designed to be applicable to new, original equipment manufacturer (OEM) and existing (i.e., retrofit) jet propulsion or torque-producing engines such as, for example, gas turbine and rapid air movement (RAM)/supersonic combustion rapid air movement (SCRAM) jet engine installations (with or without afterburner capability) and replace the current "spark-gap" types of igniter. This design can offer significant advantages such as, for example, simplified design, reliability, weight reduction, reduction of spark-induced radio frequency (RF) noise interference and electromagnetic interference (EMI), and the reduction of costs associated with acquisition, operation, and maintenance.

Igniters previously used for high power-to-weight ratio combustion type engines such as gas turbines used through the aviation industry have been of the spark-gap type. The supplemental equipment used to generate the very high voltages and the metallic shielding required to try to prevent the escape of radio frequency interference (RFI) adds a great deal of weight to the vehicle.

A unique combination of properties can make advanced ceramics, such as, for example, silicon nitride ($Si_3N_4$ Alt: Si3N4 or Si.sub.3 N.sub.4), ideal encasement materials for the exposed electrical resistance elements, especially for flight-critical engine components repeatedly subjected to cyclical thermal shocking events such as, for example, engine starts and afterburner operation. A very hard but lightweight material, $Si_3N_4$ has high mechanical strength and resistance to fracture and high temperature deformation. Additionally, the non-porous ceramic material can be highly resistant to chemical attack and—due to its low coefficient of thermal expansion—can also withstand repeated thermal shocks.

Because of their efficiency, durability, maintainability, and ease of use; the hot surface type of igniter system is becoming a more common ignition method in a number of terrestrial (i.e., fixed) applications including, for example, natural/liquefied petroleum (LP) gas furnaces, spa and pool heaters, high-end domestic appliances such as, for example, stove tops and ovens, as well as small tankless and/or quick-response water heaters. Very few of these household types of terrestrial applications ever require the level of operational robustness and redundancy required of mission-critical applications that may use gas turbine engines such as primary powerplants (e.g., for aviation, marine or armored land vehicle propulsion systems and emergency electrical generation). Additionally, these household types of applications seldom experience significant changes in operating conditions whereas aircraft systems experience rapid and significant changes in operating conditions at least twice per flight during takeoff and landing.

Until recently, the materials used in the fabrication of automotive glow-type plugs have not been able to provide the mission-critical reliability required of transport category aircraft.

The present invention provides ignition systems for jet engine systems such as, for example, gas turbine engines, RAM and/or SCRAM jet engines or afterburners. The invention provides a system and method for igniting fuel within a jet engine system (e.g., gas turbine engine, RAM or SCRAM jet engine or afterburner) using at least one advanced ceramic-encased hot surface igniter and a control system. In one embodiment, a suitable ceramic may be silicon nitride. The system and method may be used in a variety of engine configurations including those used for airborne, land-based, and/or marine propulsion systems, as well as auxiliary power generation systems. The system also provides advantages, in terms of interchangeability of parts and cost-effectiveness and can be suitable for use in new engines and similar devices as well as for retro-fit and replacement part installations.

Referring to FIG. 1, in one embodiment, as shown in the partial cutaway perspective drawing of FIG. 1, a shaped element hot surface igniter (HSI) assembly 1 is shown installed within a representative combustion section of a gas turbine engine. The active igniter tip 2 of the shaped element HSI assembly 1 comprises a pair of cylindrically shaped silicon nitride encasements 3 that are anchored with a high temperature-resistant potting ceramic 4 inside of a threaded metallic casing 5. Power is supplied to the shaped element HSI assembly 1 through three electrically conductive lead wires 6 that have a high temperature-resistant insulation 7 that is also secured within the potting ceramic 4. In one embodiment, the shaped-element HSI assembly 1 may be securely threaded into a boss 8 integrated into the combustion section shell 9 in such a manner that the cylindrically-shaped silicon nitride encasements 3 of the active igniter tip 2 can be nominally aligned with the direction of a flow 10 of a fuel or a fuel/air mixture. At least one washer 12 capable of withstanding prolonged high temperature operation may be used in the dual role of a sealing and a spacing device to ensure a leak-resistant installation mounted flush within the inside wall of the combustion section shell 9.

In one embodiment, a directionally-orienting feature 11—in this case a small indentation visible to the installer—can be made in a hexagonal head of the threaded metallic casing 5 to ensure correct orientation of the shaped element HSI assembly 1. In another embodiment, a directionally-orienting feature may be incorporated into the combustion section shell 9 for greater reliability of correct installation.

In the embodiment illustrated in FIG. 1, a shaped-element HSI assembly 1 may provide a measure of operational redundancy as the two outer leads 6 may be internally configured and connected to receive power from up to two power sources. In this embodiment, the third (middle) lead 6 may then serve as a common lead to ground. In the event that one of the pair of cylindrical encasements 3 is rendered operationally inoperative from external damage or internal electrical failure, the shaped-element HSI assembly 1 could still continue to provide safe and effective operation by using the other cylindrical encasement 3 of the pair.

Figure 2:
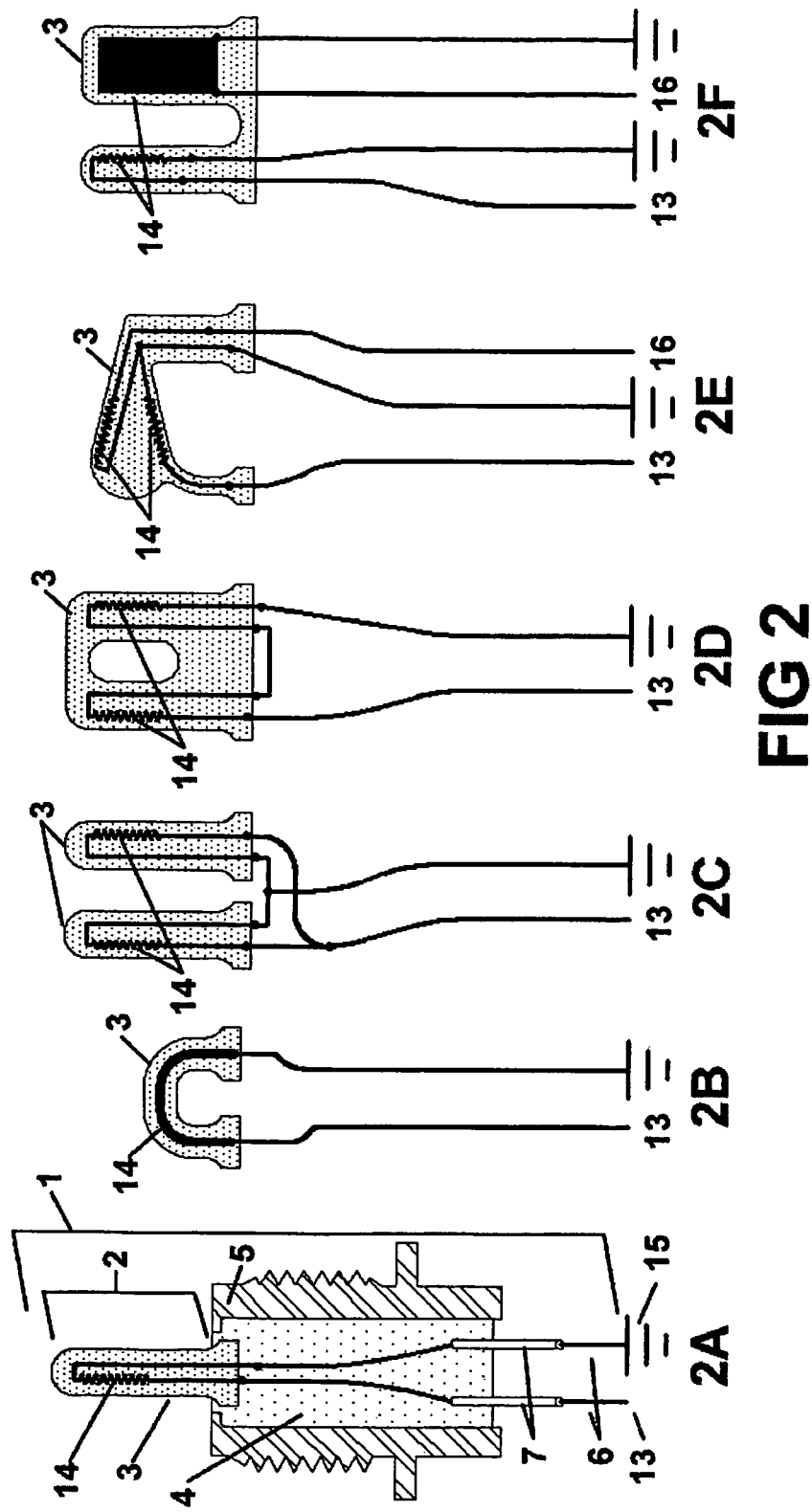
FIG. 2 illustrates exemplary internal wiring configurations that may be used within the shaped-element hot surface igniter assemblies according to an embodiment of the present invention.

A set of six schematic diagrams as examples of internal wiring configurations within shaped-element HSI assemblies is illustrated in FIG. 2. FIG. 2A presents an example of one embodiment of a shaped-element HSI igniter assembly 1, shown in cross section, with a single active igniter tip 2 comprising a single resistive heating element 14, shown schematically as a resistance wire, in electrical connection with two lead wires 6 and surrounded by a shaped silicon nitride encasement 3. The resistive heating element 14, the shaped silicon nitride encasement 3, and the insulated 7 lead wires 6 are anchored within the threaded metallic casing 5 using the potting ceramic 4 material. Operationally, electric power flows from one lead wire 6, designated a power lead 13, through the resistive heating element 14, and out the second lead wire 6, designated the ground lead 15 and shown using the schematic ground symbol.

Turning to FIG. 2B which illustrates only the leads and active igniter tip of the single shaped-element HSI igniter assembly in a simplified schematic, a second example of a wiring configuration for an embodiment using a different type of resistive heating element is shown. In the FIG. 2B embodiment, electric power flows from the power lead 13, through the resistive heating element 14, shown in this example as a carbon resistive element contained within a single arched silicon nitride encasement 3, and to ground.

FIG. 2C illustrates a third example wiring configuration embodiment of a shaped-element HSI assembly wherein the active igniter tip comprises two resistive heating elements 14 each contained within a separate pin or fin-shaped silicon nitride encasement 3. In the FIG. 2C embodiment, electric power flows from the power lead 13 to each resistive heating element 14 and out to ground; in this embodiment the internal wiring connections comprises a electrical circuit wired in a parallel configuration. The FIG. 2C parallel circuit embodiment provides an increase in safety and performance from the FIGS. 2A and 2B embodiments as a single broken, damaged, or inoperable tip in the FIG. 2C embodiment would not necessarily lead to the complete failure of the shaped-element HSI assembly.

FIG. 2D illustrates a forth example wiring configuration embodiment of a shaped-element HSI assembly wherein the active igniter tip comprises two resistive heating elements 14 contained within a single silicon nitride encasement 3. In the FIG. 2D embodiment, electric power flows from the power lead 13, through two resistive heating elements 14 connected in a series-type electrical circuit, and then out to ground.

FIG. 2E illustrates a fifth example wiring configuration embodiment of a shaped-element HSI assembly wherein the active igniter tip comprises a single silicon nitride encasement 3 that encloses two separate resistive heating elements 14, each of which receives power from a separate source but may be connect together electrically to sink the power through a single common lead to ground. In the FIG. 2E embodiment, electric power from one power source flows from the power lead 13 through one of the two resistive heating elements 14, schematically shown here as a resistance wire, and then out to ground. A second, independent source provides power through a second, independent power lead 16 through the second resistive heating element and can be electrically connected to the grounding lead of the first circuit within the body of the shaped-element HSI assembly. Shaped-element HSI assemblies with three external leads, such as the example presented in the FIG. 1 embodiment, would typically have this type of internal wiring configuration. It should be noted that this style of internal wiring configuration offers an even higher level of redundancy and safety over the dual element single source embodiments presented in FIGS. 2C and 2D as the failure of one of the power source would not render the shaped-element HSI igniter assembly completely inoperable.

FIG. 2F illustrates a sixth example wiring configuration embodiment of a shaped-element HSI assembly wherein the active igniter tip can comprise two independently controlled resistive heating elements 14 that can be contained within separate features of a single silicon nitride encasement 3. As shown in FIG. 2E embodiment, the shaped-element HSI assembly may receive power from two separate power sources but instead of sharing a single, common ground lead each resistive heating element 14 can have its own ground lead. In the FIG. 2F embodiment, electric power from one power source can flow from the power lead 13 through one of the two resistive heating elements 14, schematically shown here as a resistance wire, and then out through the ground lead. A second, independent power source can provide power through a second power lead 16 through the second resistive heating element, schematically shown here as a planar carbon resistive element which can be electrically connected to a separate grounding lead.

This example wiring configuration illustrated in FIG. 2F embodiment represents an operationally robust wiring configuration since each resistance heating element is operationally independent of the other. Therefore, in a "worst case" situation—such as a foreign object damage (FOD)-induced mishap (e.g., a bird strike) leading to a broken encasement causing a subsequent mechanical failure of a ground lead within the potted ceramic—a shaped-element HSI assembly with internally wiring configured as in the FIG. 2F embodiment would have the best chance of operational survivability and continued operation.

It should be noted that the example shapes of the silicon nitride encasements shown in the FIG. 2 embodiments are only representative in nature; encasement shapes do not necessarily require particular wiring configurations. Accordingly, this series circuit wiring could be easily adapted to a two pin or fin shaped-element encasement configuration presented in FIG. 2C just as easily as resistive heating elements wired in a parallel circuit configuration could be easily adapted to a single shaped-element encasement. Specific operational requirements such as reliability, built-in redundancy, and economic factors can dictate a suitable range of the styles of shaped encasement(s), number of elements, and internal/external wiring configurations. In addition, although the FIG. 2 embodiments have been drawn to show the grounding leads exiting from the end of the metallic casing, electrical circuits culminating with a common ground could terminate within and be securely attached to the metallic casing such that the metallic casing, most commonly threaded into an electrically grounded metal engine component, becomes a part of the electrical circuit.

Figure 3:
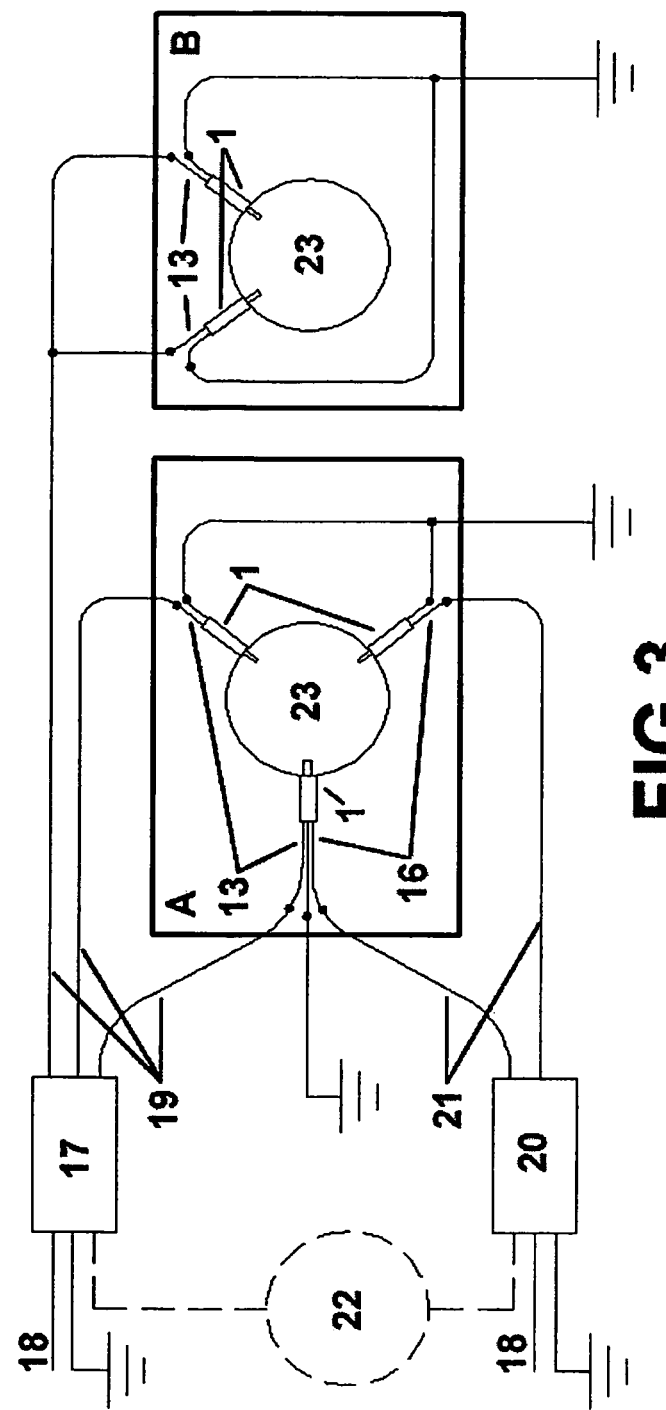
FIG. 3 illustrates dual igniter controller system showing representative igniter assembly wiring configurations in two combustion sections according to an embodiment of the present invention.

In the embodiment as shown in FIG. 3, representative igniter assembly wiring configurations are presented schematically with respect to a plurality of shaped-element HSI assemblies and at least one igniter controller used to provide electric power. In this embodiment, a primary igniter controller 17 can receive power directly from a battery bus 18 and can have a plurality of outputs 19 in direct electrical communication with the power leads 13 of the shaped-element HSI assemblies 1. A secondary igniter controller 20 can receive power directly from the battery bus 18 and can have a plurality of outputs 21 in direct electrical communication with the power leads 16 of the shaped-element HSI assemblies 1. An optional input source 22, such as, for example, an aircraft's Full Authority Digital Engine Controller (FADEC), could be in electrical communication with both of the igniter controllers 17 and 20 to provide varying degrees of automatic operational control such as auto-relight capability.

In one representative embodiment, shown in FIG. 3 within a subsystem A, a combustion section 23, such as, for example, a combustion chamber of a gas turbine engine, can have three shaped-element HSI assemblies 1 installed, the two assemblies on the right hand side of combustion chamber are of the twin lead type (as represented in the wiring schematics 2A, 2B, 2C, or 2D of FIG. 2) wherein each assembly may be provided power and controlled by a separate igniter controller. A third shaped-element HSI assembly 1 of the triple lead type (as represented in the wiring schematic 2E of FIG. 2) as shown on the left hand side of the combustion chamber, can be in electrical communication with both igniter controllers with its two internal resistive heating elements each in electrical communication with one and only one igniter controller. Dual igniter controller-based systems can provide an increased level of operational reliability. Incorporating separately controlled and powered dual-internal resistive element shaped-element HSI assemblies as shown in FIG. 3 instead of traditional spark-based igniters can help maintain the required level of operational reliability while providing significant decreases in installed component weight savings and system complexity.

In another representative embodiment, shown in FIG. 3 within the subsystem B, a second combustion section 23, such as an afterburner or thrust augmenter, can have two shaped-element HSI assemblies 1 installed wherein the two assemblies 1 are of the twin lead type (as represented in the wiring schematics 2A, 2B, 2C, or 2D of FIG. 2) and both can be powered by a single igniter controller 17 via a single power output 19. It should be noted that the single controller, single output line configuration as shown in the subsystem B may be considered appropriate for non-critical applications where operational redundancy is neither required nor economically justified.

Figure 4:
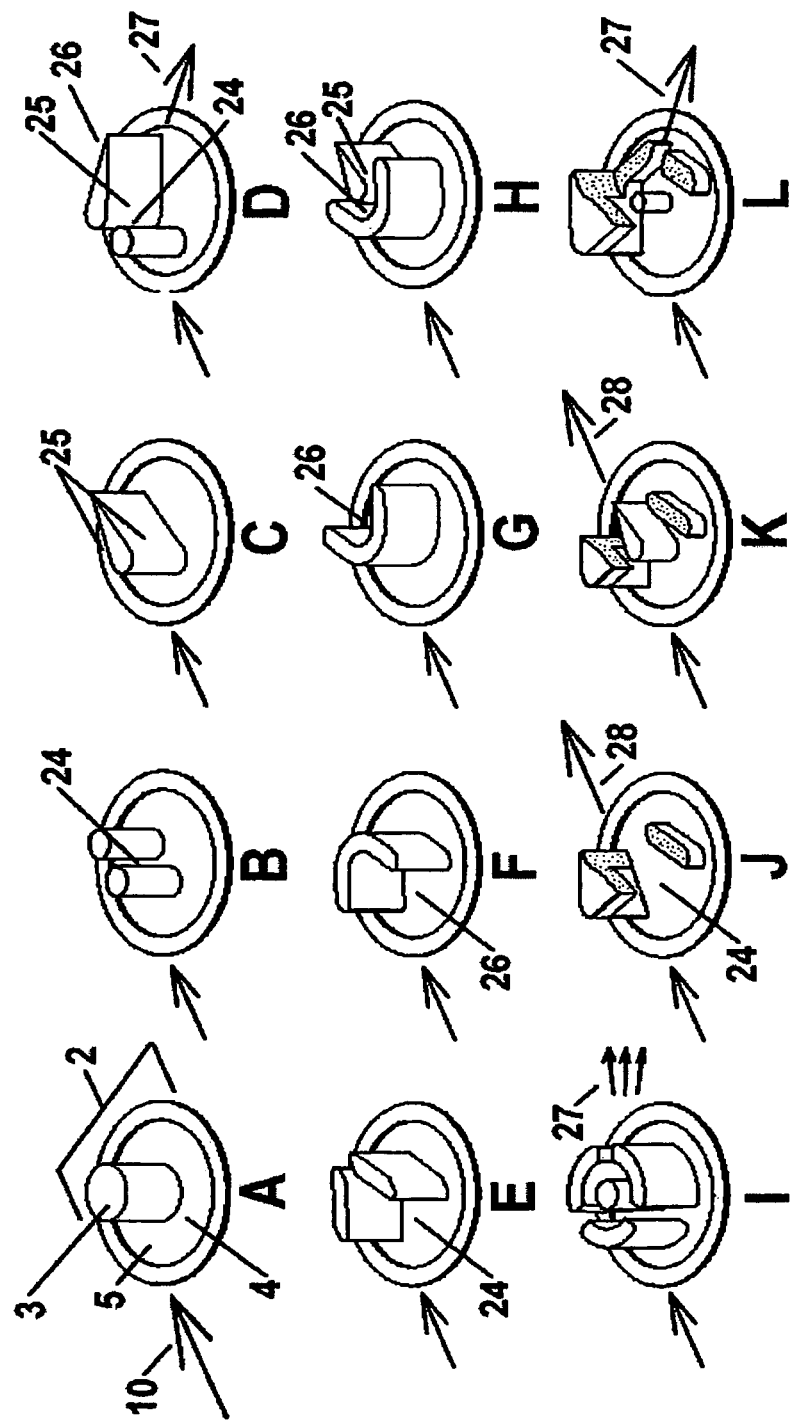
FIG. 4 illustrates perspective views of active igniter tip configurations according to an embodiment of the present invention.

FIG. 4 illustrates a set of perspective views of example active igniter tip embodiments comprising different shaped-element silicon nitride encasements showing how these shaped encasements are used singly or in oriented groups to modify the velocity and/or direction of the nominal fluid flow of the fuel or fuel/air mixture within a combustion section to increase heat transfer from the igniter to the fuel or fuel/air mixture.

In a typical jet engine, the flow rate of the combustible fuel mixture can be so high that a typical hot surface igniter running at normal voltage and current will not ignite a combustible fuel mixture. In other words, the high flow rate drops the temperature of the HSI assembly. To compensate for the higher flow rate, the controller increases the power to the heating elements of the HSI assembly based on flow rate of combustible fuel mixture (e.g., N1 RPM or N2 RPM in a turbine engine). Therefore, even with convective cooling, the HSI assembly maintains a temperature sufficient enough to initiate combustion. The loss of energy in the convective flow is such that the HSI assembly will not work if it is not compensated by increasing voltage/current as a function of flow rate. Therefore, power is increased to compensate for energy loss due to high air flow rates. The control of power is through a feedback mechanism in the controller which determines power based on the rate of airflow.

The embodiment presented in FIG. 4A is a perspective view of one example of an active igniter tip 2 comprising a nominally cylindrical, silicon nitride encasement 3 protruding perpendicularly from a threaded metallic casing 5 and anchored within a nominally flat base of temperature-resistant potting ceramic 4 wherein the cylindrical cross section of the encasement is also perpendicularly oriented to the direction of flow 10 of a fuel or fuel/air mixture. In this embodiment, the encasement 3 would be directly exposed to the flow and to the cooling effects of forced convective heat transfer; accordingly, this embodiment of a simple cylindrical shape is among the least efficient possible shapes and would therefore be applicable primarily for use in areas of relatively low flow such as within an entrapment chamber in fluid communication with the combustion section.

For the remainder of FIG. 4 embodiment drawings, the one or more geometric shapes comprising the active igniter tips (i.e. protruding from the circular end of the metallic casing) are to be considered shaped silicon nitride encasements 3 that fall within the concentric circles representing the interior end of an installed threaded metallic casing 5 and the potting ceramic 4. The small arrow to the lower left of each embodiment drawing designates the nominal direction of the flow of fuel or fuel/air mixture 10 subsequently referred to as "the fluid." Redundant item labels for items 2, 3, 4, 5, and 10 have been removed from FIGS. 4B through 4L for clarity.

The embodiment presented in FIG. 4B is a perspective view of an active igniter tip comprising two pins of nominal cylindrical cross section oriented to be nominally aligned with the fluid flow. Aerodynamically, the flow will wrap around the forward cylinder and separate generating a partially stagnated area 24 of lower velocity fluid. The aft cylinder, protected from the direct cooling effects of the nominal flow by the forward pin, would more efficiently transfer heat to the lower velocity fluid for a longer time period.

The embodiment presented in FIG. 4C is a perspective view of an active igniter tip comprising a neutral aerodynamic airfoil-shaped encasement wherein the airfoil shape is nominally aligned with the fluid flow. The primary benefit of this shaped encasement can be to generate a region of attached flow 25 to increase heat transfer from the encased resistive heating elements to the fluid by delaying the separation of flow and increasing both the amount of surface area contact and the length of contact time of the fluid with the hot surface.

The embodiment presented in FIG. 4D is a perspective view of an active igniter tip comprising a forward cylindrically-shaped encasement and an aft neutral aerodynamic airfoil-shaped encasement. The lead cylinder is used to create a region of partially stagnated flow 24 prior to the fluid's contact with the aft airfoil-shaped encasement. The primary benefit of this oriented pair of shaped encasements can be to first create a volume of slower-moving, preheated fluid and then subsequently attach this flow 25 to the second heating element on the up stream side and creating a fully stagnated fluid 26 volume at a nominally negative relative pressure on the down stream side of the airfoil-shaped encasement to enhance the total heat transferred from the active igniter tip to the fluid. The aft airfoil-shaped encasement could be either aligned with the nominal direction of fluid flow or angled as shown to direct the exiting flow 27 of fluid in another direction to maximize mixing of the ignited fuel in the combustion section.

The embodiment presented in FIG. 4E is a perspective view of an active igniter tip comprising a pair of planar encasements angled together towards the back to form an open ended 'V'-shaped entrapment zone axially aligned with the nominal direction of the fluid flow. The 'V'-shaped geometry can create a volume of partially stagnated fluid 24 which would remain in proximity of the encasement surfaces longer than if the planar elements had been aligned with the nominal fluid flow thus increasing the amount of heat transferred from the encasement to the fluid flow. Additional geometric enhancements to the basic open-'V' style of the FIG. 4E embodiment could include incorporating aerodynamic-shaped encasements into the design to achieve more attached patterns of fluid flow as achieved in the FIG. 4C embodiment shape or giving the aft end of the encasements an outwardly oriented 'J'-shape "leg" to form additional entrapment zones for stagnating the flow along the outer surfaces and a region of detached and separated flow directly behind the outwardly oriented aft legs that would affect the flow along the inner walls.

The embodiment presented in FIG. 4F is a perspective view of an active igniter tip comprising a single, closed end 'V'-shaped planar encasement forming a fully stagnated entrapment zone 26 of fluid. The fully stagnated fluid—temporarily "trapped" between the vertical walls of the 'V'-shaped encasement—would establish a constantly renewing volume of fluid of elevated temperature and form a fluidic "boundary" to shield the encasements from the forced convection cooling effects of a direct stream of fluid thus enhancing opportunities for effective heat transfer time of contact of the fluid with the active igniter tip elements.

The embodiment presented in FIG. 4G is a perspective view of the active igniter tip presented in the FIG. 4F embodiment of a single, closed end 'V'-shaped planar encasement but rotated 180° with respect to the nominal axial fluid flow to form directly behind the encasement a volume of fully stagnated fluid 26 at a nominally negative relative pressure. The "protected", slower moving volume of fluid on the downstream side of the encasement can achieve overall higher temperatures than the flow impinging directly on the two forward surfaces.

The embodiment presented in FIG. 4H is a perspective view of an active igniter tip comprising the same single, closed end 'V'-shaped planar encasement presented in the FIG. 4G embodiment to form a volume of fully stagnate fluid 26 directly behind the encasement but with the addition of a second, neutral airfoil-shaped encasement to subsequently create an attached flow 25. This embodiment offers significant advantages over the embodiments presented in FIGS. 4A through 4G as the trailing airfoil-shaped encasement, protected from direct impingement of the flowing fluid, would be transferring heat to a slower moving, attached flow. Additional geometric or operational enhancements to the basic style of the FIG. 4H embodiment could include incorporating the one or more encased resistive heating elements of the shaped-element HSI assembly into one or more trailing encasements protected by an unheated closed end 'V'-shaped planar encasement to function as a flow deflector or extending the overall height of the closed end 'V'-shaped planar encasement and arching the upper end of the encasement towards the middle to form a hood-like screen around the leading surface of the trailing encasement(s).

The embodiment presented in FIG. 4I is a perspective view of an active igniter tip comprising a central cylindrical encasement is surrounded by a concentric array of a plurality of cylindrically-shaped wall segment encasements. In the embodiment shown, each of the three 100° wall segment encasements comprises an arc of sufficient length to allow either an indirect or a direct flow to enter an annular area between each wall segment and the central cylindrical encasement of reduced flow rate. Given an odd number of cylindrically-shaped wall segment encasements, an unaligned exiting flow 27 would be present from at least one downstream exit to enhance mixing. As the FIG. 4I embodiment configuration will naturally create at least one region of partially or fully stagnated flow around at least one encasement no matter the orientation of the installed active igniter tip, this type of design offers significant advantages over the other embodiments presented in FIG. 4. In this embodiment, the shaped-element HSI assembly does not have to be oriented in any particular direction with respect to the nominal flow direction of the fuel or fuel/air mixture. Additional geometric enhancements to this orientation-independent style of active igniter tip can include a plurality of nested, non-connected, spiraling segments wherein the inside "head" of each spirally-shaped encasement segment was protected from direct impingement of the fluid flow by the "tail" of another spirally-shaped encasement segment thus creating a non-direct path through the central region of the active igniter tip The embodiment presented in FIG. 4J is a cutaway perspective view of an active igniter tip comprising an open-ended funnel design wherein a pair of planar encasements angled together towards the back to form an open ended 'V'-shaped entrapment zone axially aligned with the nominal direction of the fluid flow similar to the FIG. 4E embodiment is capped with a horizontal encasement serving as a "roof" to enclose the active igniter tip. In this embodiment, the direction of the exiting heated fluid 28 is nominally aligned with the incoming stream. An advantage of the FIG. 4J embodiment over the "open air" style of the FIG. 4E embodiment would be the ability of the horizontal encasement to trap the flow and prevent the partially stagnated flow 24 from spilling over the upper surface of the planar encasements and away from the active igniter tip as it would in the FIG. 4E embodiment. Additional geometric enhancements to this open-ended funnel style of active igniter tip could include using a conically-shaped, hollow encasement and incorporating more aerodynamically shaped airfoil wall sections to prolong flow attachment.

The embodiment presented in FIG. 4K is a cutaway perspective view of a active igniter tip comprising the basic open-ended funnel design of the FIG. 4J embodiment but with the addition of a central airfoil-shaped encasement within the nominally enclosed volume. An advantage of this style of active igniter tip design would be increased surface contact through the creation of an attached flow around the leading central encasement followed by a non-accelerating passage of the flow through a non-reducing volume to prolong proximal contact of the fluid with the inner surfaces of the outer encasement and the trailing surfaces of the central encasement.

The embodiment presented in FIG. 4K is a perspective view of an active igniter tip comprising the basic open-ended funnel design of the FIGS. 4J and 4K embodiments but with the addition of a cylindrically shaped central encasement located within the nominally enclosed volume and an unaligned exit to generate the unaligned exiting flow 27 with respect to the nominal axial fluid flow. The advantage of such a complex embodiment would be to create a nominally entrapped or attached volume of slow moving fluid in sustained contact with multiple encasement surfaces to increase the amount of heat transferred from the encasement surfaces to the fluid and to discharge the heated fluid in a non-axially aligned direction to maximize mixing of the heated fuel or fuel/air mixture within the combustion section. Additional geometric enhancements to this open-ended, non-aligned funnel style of active igniter tip could include using a conically-shaped, hollow encasement and incorporating more aerodynamically shaped airfoil wall sections to prolong flow attachment.

It should be noted that within the description of each shaped-encasement embodiment presented in FIG. 4 neither (a) the number, type, and orientation of the encased resistance heating elements nor (b) the configuration of the internal wiring and connections should be assumed or implied. Although the geometry of certain encasements may during manufacturing lend themselves readily to a particular style of resistance heating element and/or wiring configuration (i.e., two coiled resistance wires for the FIG. 4B embodiment wired per the FIG. 2C embodiment; two separate V-shaped planar carbon resistive elements for the FIG. 4E embodiment wired per the FIG. 2F embodiment, etc.), each encasement shape should be considered to be independent of a particular resistive heating element requirement or internal/external wiring configuration.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An igniter system adapted for use in a jet engine system, the igniter system comprising at least one hot surface igniter located so as to be a part of at least one combustion section of a jet engine, and at least one source of electrical power, wherein: the at least one hot surface igniter comprises a shaped ceramic encasement and a resistive heating element; the shaped ceramic encasement surrounds the resistive heating element, such that the shaped ceramic encasement is in thermal communication with the resistive heating element; the resistive heating element is in electrical communication with the at least one source of electrical power; the at least one hot surface igniter is located within the at least one combustion section in such a way as to impact a flow of air and fuel; and the resistive heating element is in electrical communication with one or more igniter control modules, wherein the one or more igniter control modules comprises a computer controller configured to regulate power based on rate of the flow of air and fuel to the at least one hot surface igniter and to overdrive the resistive heating element to compensate for convective cooling within the jet engine.

2. The igniter system according to claim 1, wherein the jet engine comprises a gas turbine, turboshaft-type engine, a pulse jet engine, a rapid air movement (RAM) type engine, a supersonic-combustion rapid air movement (SCRAM) type engine, or combination of engines thereof.

3. The igniter system according to claim 1, wherein the shaped ceramic encasement is formed of a ceramic compound having high thermal resistance and thermal conductivity and exhibiting thermal and mechanical shock resistance, and the ceramic compound is in physical contact with the resistive heating element.

4. The igniter system according to claim 3, wherein the ceramic compound comprises silicon nitride.

5. The igniter system according to claim 1, wherein the at least one hot surface igniter is securely mounted within or on a surface of the at least one combustion section of the jet engine such that the shaped ceramic encasement is in proximal contact with the flow of air and fuel.

6. The igniter system according to claim 1, wherein the at least one combustion section of the jet engine further comprises an afterburner section and the at least one hot surface igniter is mounted within or immediately upstream of the afterburner section.

7. The igniter system according to claim 6, wherein the at least one hot surface igniter is mounted in at least one array configuration within or immediately upstream of the afterburner section.

8. The igniter system according to claim 1, wherein the shaped ceramic encasement creates flow stagnation or flow attachment and increases contact time of a mixture of air and fuel of the flow of air and fuel with the shaped ceramic encasement as the flow of air and fuel is provided to the shaped ceramic encasement.

9. The igniter system according to claim 1, wherein the jet engine was originally manufactured to employ a spark gap igniter assembly, wherein the igniter system is adapted for retrofit installation to replace the spark gap igniter assembly.

10. The igniter system according to claim 8, wherein the shaped ceramic encasement comprises an airfoil shape.

11. The igniter system according to claim 8, wherein the shaped ceramic encasement comprises a cylindrical shape.

12. The igniter system according to claim 11, wherein the cylindrical shape is surrounded by a concentric array of wall segments.

13. The igniter system according to claim 8, wherein the shaped ceramic encasement comprises an open "V" shape or a "J shape".

14. The igniter system according to claim 8, wherein the shaped ceramic encasement comprises a horizontal roof portion.

15. The igniter system according to claim 8, wherein the shaped ceramic encasement comprises a fin shape.

16. The igniter system according to claim 1, wherein the resistive heating element is a carbon resistive heating element.

17. The igniter system according to claim 1, wherein the shaped ceramic encasement of the at least one hot surface igniter surrounds a second resistive heating element.

18. The igniter system according to claim 17, wherein the resistive heating element is in electrical communication with a first subset of the at least one source of electrical power and the second resistive heating element is in electrical communication with a second subset of the at least one source of electrical power, and the first subset is distinct from the second subset.

19. The igniter system according to claim 1, wherein the at least one combustion section of the jet engine further comprises at least one combustion chamber and the at least one hot surface igniter is mounted within or immediately upstream of the at least one combustion chamber.

20. An igniter system adapted for use in a jet engine system, the igniter system comprising: at least one hot surface igniter located so as to be a part of at least one combustion section of a jet engine, wherein the at least one hot surface igniter comprises a shaped ceramic encasement surrounding a resistive heating element and wherein the at least one hot surface igniter is located proximally upstream of or within the at least one combustion section in such a way as to slow, attach or stagnate a flow of air and fuel, wherein a rate of slowing, attaching and stagnation of the flow of air and fuel is due to a geometry of the shaped ceramic encasement of the at least one hot surface igniter located proximally upstream of or within the at least one combustion section, and a computer controller in electrical communication with the resistive heating element of the at least one hot surface igniter, wherein the computer controller is programmed to control the amount of heat transferred from the shaped ceramic encasement of the at least one hot surface igniter to the flow of air and fuel by increasing or decreasing power applied to the resistive heating element of the at least one hot surface igniter based on the rate of the flow of air and fuel, wherein the resistive heating element is overdriven while the power applied to the resistive heating element is increased, such that the amount of heat produced is sufficient to cause ignition of the fuel.

* * * * *